United States Patent

Phillips

[15] 3,642,116
[45] Feb. 15, 1972

[54] ARTICLE INVERTOR
[72] Inventor: Howard D. Phillips, Edison, N.J.
[73] Assignee: National Can Corporation, Chicago, Ill.
[22] Filed: Oct. 2, 1969
[21] Appl. No.: 863,284

[52] U.S. Cl. ..........................198/33 AD, 198/31 R, 214/1 Q
[51] Int. Cl. ..........................................................B65g 47/24
[58] Field of Search ..........................214/1 RA; 198/33, 31 R; 193/36

[56] References Cited

UNITED STATES PATENTS

| | | | |
|---|---|---|---|
| 1,576,710 | 3/1926 | Beulke | 193/36 X |
| 1,967,397 | 7/1934 | Cutler | 193/36 X |
| 2,514,190 | 7/1950 | Schlichter et al. | 214/1 RA |
| 2,851,147 | 9/1958 | Hageline et al. | 198/33 R |
| 3,447,696 | 6/1969 | Calistrat | 198/33 R X |

*Primary Examiner*—Gerald M. Forlenza
*Assistant Examiner*—Frank E. Werner
*Attorney*—Robert J. Doherty

[57] ABSTRACT

A mechanism for turning articles, for example, filled cartons, upside down as the articles are transported along a conveyor line.

6 Claims, 5 Drawing Figures

INVENTOR.
HOWARD D. PHILLIPS
BY
Robert J. Doherty
ATTORNEY

INVENTOR
HOWARD D. PHILLIPS

ARTICLE INVERTOR

This invention relates to an article inverter or turnover device which is particularly useful in inverting or turning over filled cartons or cases, or the like, but which may also be used to invert or turn over other rectangular parallelepiped-shaped articles. The cartons and cases to which this invention applies have a substantial third dimension rather than being essentially two-dimensional. Indeed, the articles to which this invention applies have a height dimension such that the ratios of length to height and width to height do not exceed 4 to 1.

One object of the invention is to provide a simple, inexpensive, and effective mechanism, in combination with conveyor means, for inverting filled cases or similar articles as they are advanced along the conveyor means that include this inverter.

Another object of the invention is to provide a filled carton inverter which accomplishes its purpose with only gentle jostling of the goods within the cartons being turned over.

A still further object of the invention is to provide an inverter which, within limits, will handle articles of varying size.

Another object of the invention is to provide an article inverter which can be easily be bypassed without removing it from a conveyor line in which it is installed when there is no desire on the part of a user to invert the articles passing along the conveyor line.

Another object is to provide an inverter mechanism which will serve to turn overfilled cartons, or the like which may have at least some of their closure flaps unsealed.

A still further object of the invention is to provide an inverter that will accept, from a top flap sealing device, cartons having their bottom flaps folded closed, but unsealed and their top flaps folded closed and sealed, and discharge such cartons so that the unsealed bottom flaps are uppermost.

Another object of the invention is to provide an inverter or turnover mechanism whereby cartons or cases which are being fed along an upstream conveyor with their opensides down will be engaged by the mechanism and be discharged onto a downstream conveyor with their opensides up.

Another object of the invention is to provide, in an article inverter, article-triggered, ram-including motor means for causing the articles to be tilted overcenter while in engagement with roller means thereby inverting the articles.

Other objects and advantages of the invention will be apparent from the remainder of the specification and from the drawings which form a part of this application. In the drawings.

Figure 1:
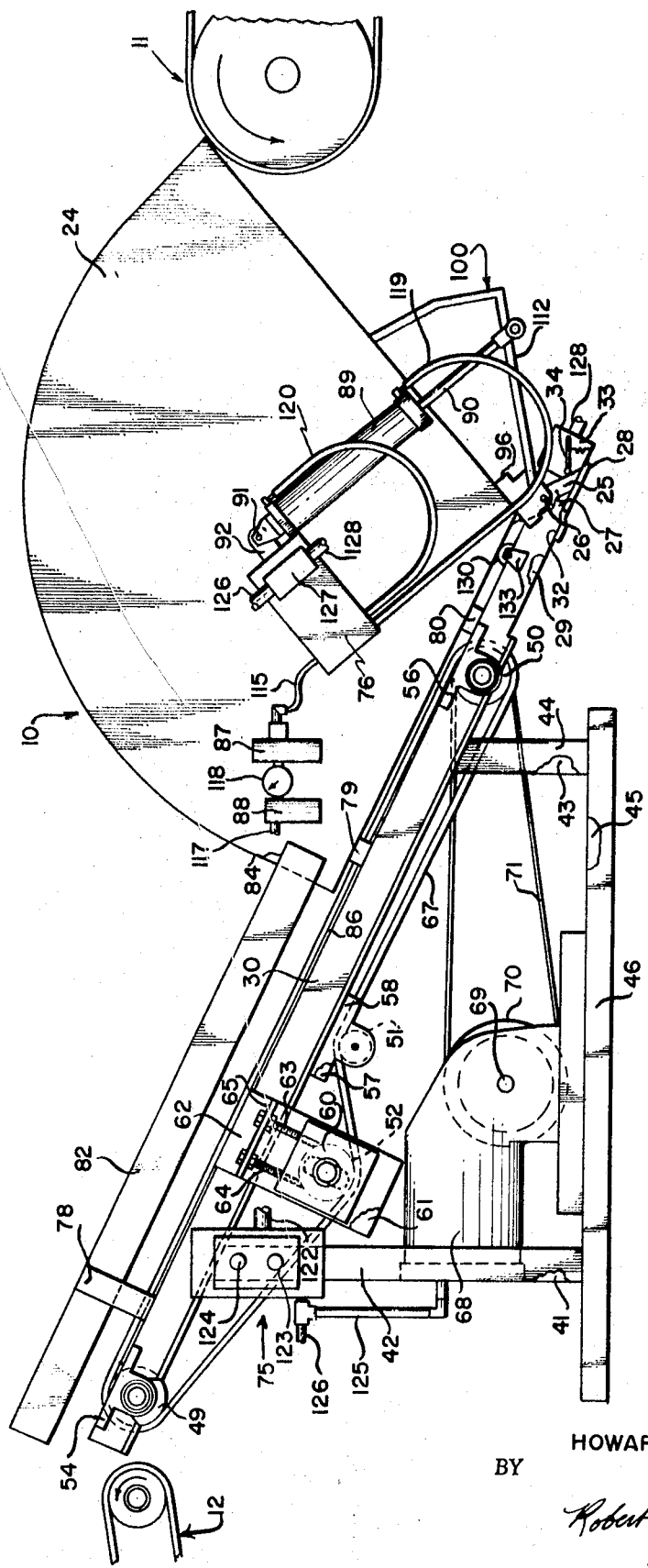
FIG. 1 is a side elevational view with certain portions broken away showing the article inverter of this invention interposed in a conveyor line between two endless belt-type conveyors.

Referring now to the drawings by reference numerals, FIG. 1 shows the inverter of the invention, generally designated as 10, interposed in a filled carton-conveying line between the discharge end of the compression section, designated generally as 11, of a conventional top flap sealing machine, and a downstream conveyor, designated generally as 12. The compression section 11, just mentioned, may be the type seen in U.S. Pat NO. 1,922,412, at 2. Upstream of section 11 may be located, for example, a loading or casing machine (not shown) by means of which articles, such as empty cans, are loaded into the cartons for shipment to customers of a can making company. Downstream conveyor 12 may be an endless belt conveyor by means of which cartons are transported from the inverter to, for example, a palletizer or other packing station (not shown). By way of illustration only, since the inverter shown herein is capable of being utilized with other types of input and discharge conveyors than those designated as 11 and 12, let it be assumed that setup but empty unsealed cardboard cartons, designated generally as 15, are filled with empty cans at the casing machine mentioned above, after which cartons 15 pass through the top flap sealing machine, including the compression section 11 thereof, whereby their top flaps are glued together in such fashion as to seal the top of the filled cartons. The top flap sealing machine does not seal the bottom flaps of cartons 15.

In the present case it is desirable that cartons 15 be sent to the can user on pallets with their unsealed flaps of the cartons uppermost so that ready access of the cans may be had. Accordingly, means are provided to turn cartons 15 over between machine 11 and the time at which cartons 15 are placed on the pallets. Often this means takes the form of an additional unskilled worker which by use of the inverter of the present invention may be omitted and thus finds utility in the example just discussed.

Before proceeding with the detailed description, it is believed that the following general description of the operation of inverter 10 would be helpful in an overall understanding of the invention:

Filled cartons each having a greater length than width and having their top flaps sealed and their bottom flaps unsealed, are presented to the inverter lengthwise from the conveyor of compression section 11 in spaced fashion. Upon entering the inverter the cartons descend a downwardly included slide, one at a time, with the unsealed flaps of the cartons engaging the slide. In descending this slide the cartons are substantially centered relative to the centerline of the slide by means of opposed centering spring means. At the bottom of the slide, in a position to be contacted by the descending cartons, is a trigger element, and a combination stop and pivot roller. The stop and pivot roller is located in front of the slide a distance slightly less than half the height of the cartons being inverted. In descending the slide the lower end of each carton, in turn, first depresses the trigger element and then engages the stop and pivot roller. Actuation of the trigger element sends a signal to conventional electrically operated valve means which valve means in turn, cause an air cylinder to move a pusher element, located behind the front surface of the slide, forward, toward an against the slide engaging, unsealed side of the carton near the top hereof. Upon engaging the carton, as noted, the pusher element continues to move forwardly briskly enough so that the carton is caused to move to and beyond a vertical position while supported on the stop and pivot roller. Once beyond vertical the downstream end of the carton continues to descend until its lowermost side, now the sealed flap side, engages an upwardly included endless belt discharge conveyor. Once at the top or discharge end of the discharge conveyor the cartons, now with their unsealed or open flap side uppermost, may be further conveyed as desired.

Figure 2:
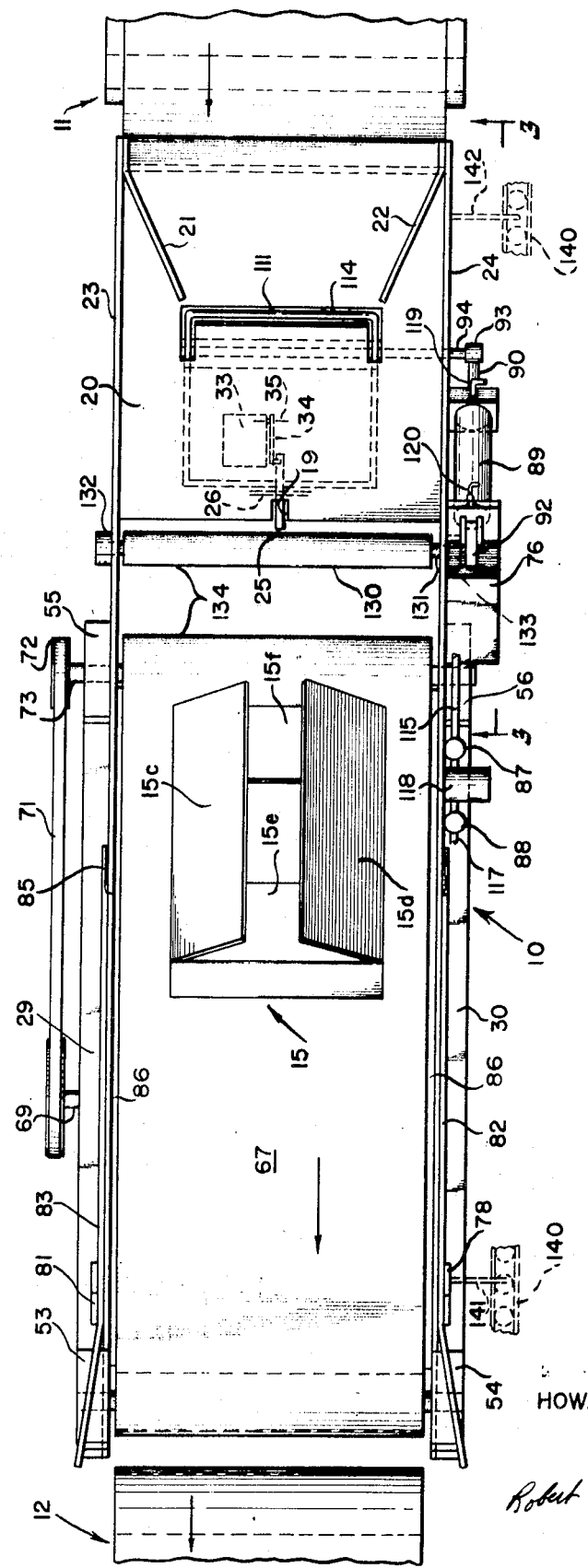
FIG. 2 is a plan view, with certain portions omitted of the inverter of FIG. 1.
Figure 3:
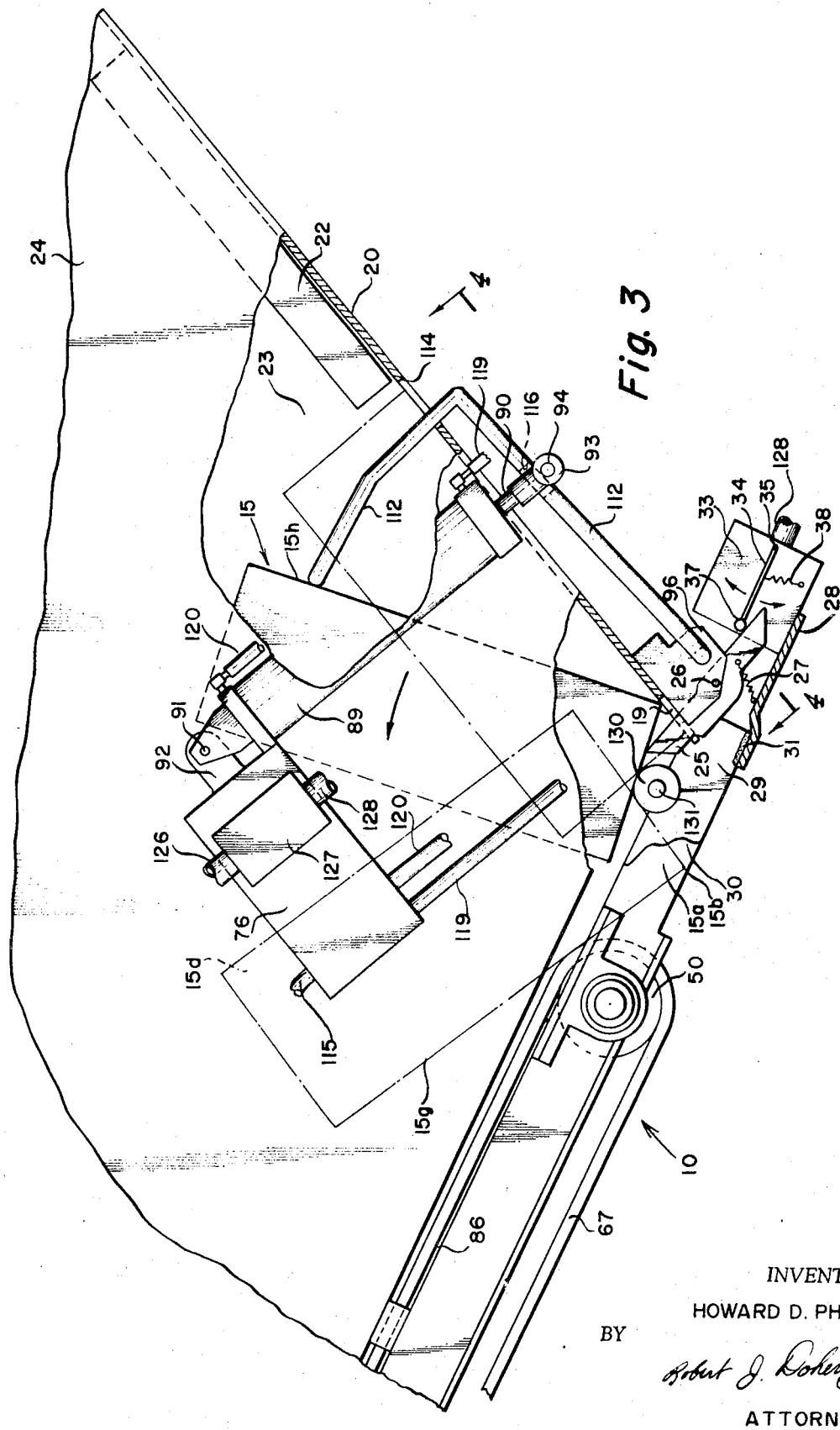
FIG. 3 is a sectional view, to an enlarged scale and with certain portions broken away taken on the line 3—3 of FIG. 2.
Figure 4:
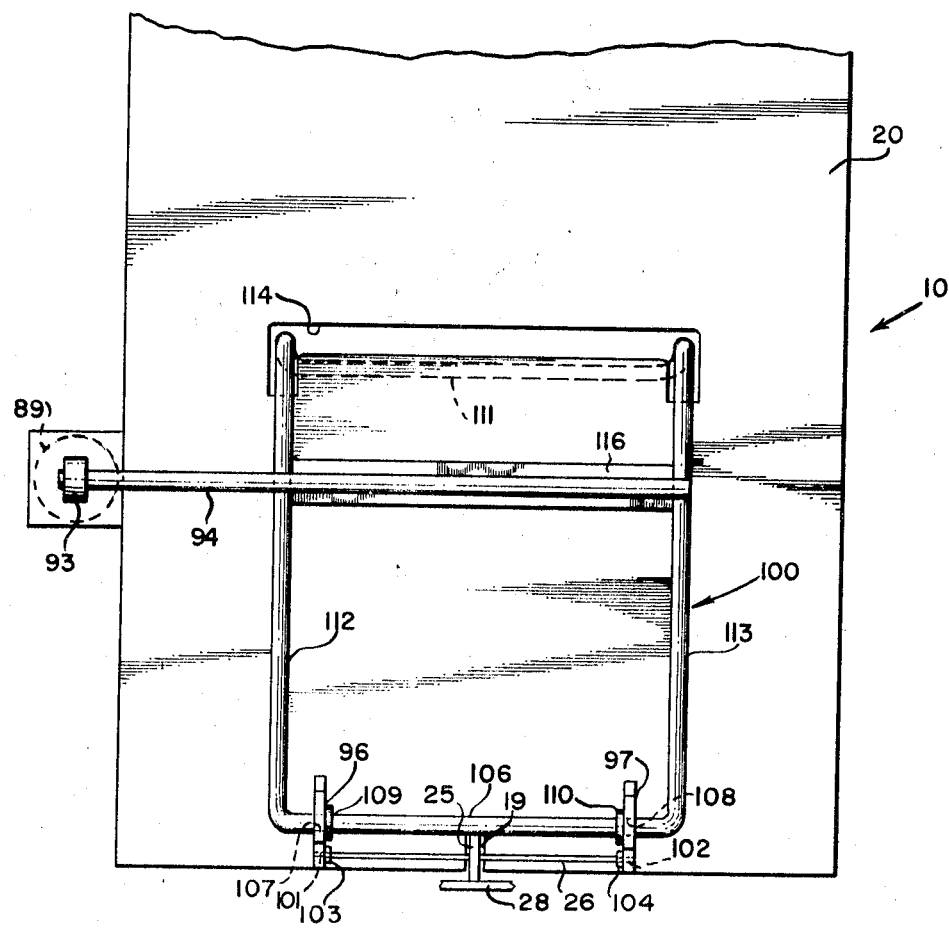
FIG. 4 is a sectional view with certain parts omitted taken on the line 4—4 of FIG. 3; and, FIG. 5 is a schematic side elevational view showing how the inverter of this invention can be bypassed with removing it from a conveyor line in which it is installed.

Referring again to the drawings, and particularly FIGS. 2, 3, and 4 thereof, the numeral 20 denotes the downwardly inclined slide; cantilevered leaf springs 21 and 22 collectively comprise the opposed centering spring means. The upstream ends only of springs 21 and 22 are affixed, by means of welding, or the like not shown, to slide sidewalls 23 and 24 which, respectively, are attached to an extend upwardly from the opposite side edges of slide 20. The trigger element denoted by 25 is affixed to a horizontally oriented pivot rod 26. The manner in which pivot rod 26 is mounted for rotation will be described hereinafter. Trigger element 25, except when engaged by a carton, is biased, by means of a tension spring 27 attached, by means not shown, between 25 and a plate 28, to the position in which it is shown in FIG. 1, i.e., with the lower end of the trigger element 25 abutting and being held from further clockwise pivotal movement by plate 28. Plate 28 is supported for coation with the trigger element between the lowermost portions of the main frame members 29 and 30 of the inverter by having its opposite ends welded to these frame members, as at 31 and 32.

Plate 28 also supports a switch 33 from which extends a switch arm 34. Switch arm 34 is mounted relative to switch 33 so as to be capable of oscillation in the manner indicated by the arrows in FIG. 3 about a pivot axis 35. At its left-hand end, as viewed in FIG. 1 and 3, switch arm 34 carries a roller 37 which is biased by a tension spring 38, connected between arm 34 and switch 33, into continual engagement with the upper surface of trigger element 25. Main frame member 29, it will be noted by viewing FIG. 1, is supported in an inclined position by having its bottom side fastened, by welding, or the like (not shown) to the top of relatively long leg 42, and the top of shorter leg 43. Main frame member 30 is supported in like fashion by being fastened atop legs 42 and 44. Base member 45 is welded, or otherwise fastened, to the bottom ends of legs 41 and 43, and base member 44 is welded or otherwise fastened to the bottom ends of legs 44 and 42.

Extending between main frame members 29 and 30 are a top roller 49, a bottom or drive roller 50, an idler roller 51, and a takeup roller 52. Roller 49 is supported for rotation by conventional bearings 53 and 54, fastened, respectively, to members 29 and 30. Rollers 50 and 51, in like manner, are supported for rotation by spaced bearings 55 and 56, and 57 and 58, respectively. Takeup roller 52 is supported for rotation by a pair of spaced bearings, only one of which is shown at 60, mounted, respectively, on plates 61 and 62. Plates 61 and 62 in turn have their respective top ends fastened, by welding, or the like (not shown) to members 39 and 30. Rotation of screws 63 and 64 in one direction or the other causes bearing 60, and the end of roller 52 that is supports, to be raised or lowered relative to fixed plate 65, as is well known in the art. Similar screw means (not shown) cooperate with the bearing which supports the other end of roller 52 to raise and lower same. An endless belt 67 is positioned relative to rollers 49, 50, 51, and 52 as best shown in FIG. 1 and is adapted to be driven by a conventional gearcase motor 68. The motor 68 transmits its driving power to the endless belt 67 by way of shaft 69, pulley 70, which is fixed on shaft 69, drive belt 71, and pulley 72 which is fixed on a mounting shaft 73 of roller 50. Motor 68 is controlled by a conventional start-stop switch mechanism shown generally at 75. Switch 75 also provides control over an electrically operated valve means 76 to be further described hereinbelow.

Affixed to and extending upwardly from the upper sides each of the main frame members 29 and 30 are three supporting posts. Numerals 78, 79, and 80 denote these posts on frame member 30, and the three posts on member 29 are located directly opposite posts 78, 79, and 80, with only post 81 opposite post 78 being shown. Posts 79 and 80 and the like posts on member 29, respectively are fixed to and support the downstream end of slide sidewalls 24 and 23. POsts 78 and 81, respectively are affixed to and support the forward ends of side rails 82 and 83 which prevent cartons from moving laterally off of belt 67. The upstream ends of side rails 82 and 83, respectively, are fixed to sidewalls 24 and 23 by welding as at 84 and 85. Support for the upper or working run of belt 67 is provided by a plate member 86 which extends between and has its opposite edges affixed to main frame members 29 and 30. In lieu of plate member 86 a series of idler rolls could be used if desired, as is well known in the art.

The valve means 76, previously mentioned, is attached to the outer sidewall 24, by conventional fastening means, not shown, as are also a conventional air line lubricator 87 and a conventional air filter 88. A conventional air-actuated expansible chamber motor consisting of a cylinder 89 and a ram 90 has its cylinder end pivotally attached by pivot means 91 to a bracket 92 on valve means 76. The ram 90, as is conventional, fixedly carries a piston, not shown, on the end thereof which is located within cylinder 89. The other end of ram 90 has fixed thereto, a bearing assembly 93 which is pivotally attached to a cross rod 94, to be further described.

Attached to and depending from the underside of slide 20, by means of welding or the like, not shown, is a pair of apertured brackets 96 and 97. Extending between, and rotatably carried by brackets 96 and 97, are both pivot rod 26, which, in turn carries trigger element 25, and the lower end of a pusher element, designated generally as 100. Pivot rod 26 extends into apertures 101 and 102 in brackets 96 and 97, and is prevented from shifting laterally by collars 103 and 104 fixed thereto. Pusher element 100 is composed of a lower horizontal pivot portion 106 which extends through apertures 107 and 108 in brackets 96 and 97 and which is prevented from shifting laterally by collars 109 and 110 affixed thereto; an upper horizontal portion 111; and two spaced substantially L-shaped side portions 112 and 113 which, respectively interconnect the opposite ends of portions 106 and 111. POrtion 111 is normally located just below the upper face of slide 20 within an aperture 114 formed in slide 20, but is movable forwardly to the position shown in FIG. 3, whereby portions 112 and 113 extend through aperture 114, upon actuation of trigger element 25, as will be further described. Extending between and with its opposite ends affixed to portions 112 and 113 is a plate member 116 to which is welded, or otherwise nonrotatably fastened cross rod 94.

Pressurized air, from a conventional source such as a compressor, not shown, is supplied to the inverter via inlet line 117. Air-entering inlet 117 passes consecutively through filter 88, where it is relieved of contaminating particles, through a pressure gauge 118; through lubricator 87 and through conduit 115 to valve means 76. Valve means 76 is interconnected with cylinder 89, in order to supply pressurized air to the opposite sides of the piston carried by ram 90, by conduits 119 and 120. Which of conduits 119 and 120 is an exhaust conduit and which is a pressure conduit at any particular time depends on the condition of valve means 76 at that time. Electrical power is supplied to the inverter from a conventional source, not shown, via cable 122. If the "off" or stop pushbutton 123 of the switch mechanism 75 has been depressed, then power cannot proceed beyond such switch mechanism. However, if the "on" or start pushbutton 124 has been depressed, then power is supplied via cable 125 to energize motor 68, and via cable 126 to an electrical control box 127 mounted on the case of valve means 76. A power lead 128 also interconnects valve means 76 with switch 33 in such manner that depression of the left-hand end of trigger 25 as viewed in FIG. 3, by a carton 15 descending slide 20 causes roller 37 and switch arm 34 to actuate switch 33 to send a signal to valve means 76. This signal causes valve means 76 to supply pressurized air to conduit 119, which simultaneously opening conduit 120 to exhaust, thereby causing ram 90 to retract, moving portion 111 forcefully against the then uppermost portion of the carton which actuated trigger element 25 and causing the carton to tip over, and thus be inverted, as best shown in FIG. 3, while supported on a roller 130.

While the pusher element 100 and its associated parts could be designed so that ram 90, upon retraction, would cause portion 111 of the pusher element to continue to engage surface 15h of carton 15 even slightly after carton 15 is tilted beyond a vertical position toward belt 67 during the inverting sequence shown in FIG. 3, it has been found in practice that engagement of portion 111 with surface 15h need not continue beyond the point at which the pusher element is shown in FIG. 3. This is because the pusher element 100, by the time it reaches the position shown in FIG. 3, has imparted to carton 15 sufficient momentum to carry the carton on through its tilting movement whereby surface 15g comes into engagement with belt 67. Immediately after pusher element 100 reaches the FIG. 3 position the ram extends and returns pusher element 100 to its FIG. 1 position. This latter action occurs because trigger element by this time is no longer depressed and, thus, switch 33 is returned to its FIG. 1 position, in which position it commands valve means 76 to extend ram 90. When ram 90 extends, conduit 120 becomes the pressure line and conduit 119 the exhaust line.

Roller 130, which includes an axle 131, is journaled for rotation in spaced bearings 132 and 133 fixed respectively to members 29 and 30. Between roller 130 and the lower end of belt 67 is an open space designated by the bracket 134 in FIG. 2. This space is provided to allow portion 15a (see FIG. 3) of carton 15 to descend thereinto as surface 15g of carton 15 comes into engagement with belt 67, the top reach of which is running in the direction indicated by the arrows in FIG. 2. If space 134 were not provided, corner 15b of carton 15 would contact the upwardly moving upper run or belt 67 and would (depending on the particular dimensions of the cartons being presented) either not tip completely over so that the sealed flaps of carton 15 could engage belt 67 or could, in fact, tip back against slide 20, due to the reaction of the carton against the moving belt 67, thereby impeding the progress of following cartons.

Numerals 15c, 15d, 15e, and 15f denote, respectively the unsealed outer and inner flaps of carton 15.

In view of the general description of the operation of the invention hereinabove, and in view of the detailed description which follows the general description of the operation, it is believed that the overall operation of the inverter will readily be apparent.

Figure 5:
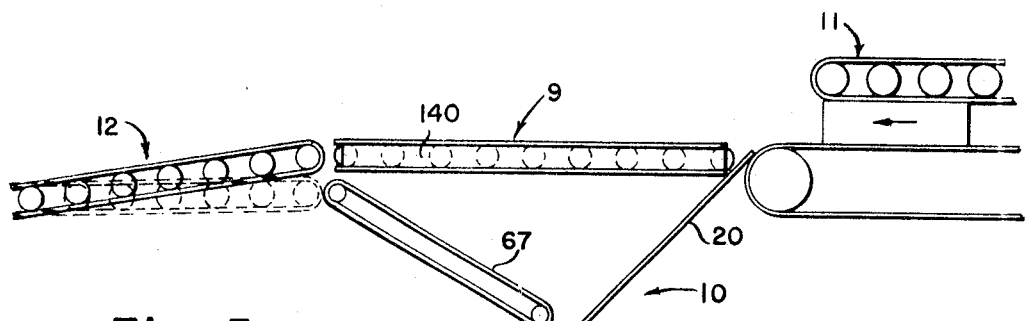

Turning now to FIG. 5, there is shown in schematic form means whereby the inverter 10 can be bypassed if there is no desire or necessity on the part of a user to invert articles being conveyed on section 11. Such means may take the form of a conventional roller conveyor, designated generally at 9, or these means may be a driven endless belt conveyor similar to the type schematically shown at 12. Conveyor 9 is adapted to be supported by means, not shown in FIG. 5, above slide 20 and belt 67 so as to directly bridge the space between the downstream end of section 11 and the upstream end of conveyor 12. The support means just mentioned could be simply a triangular wooden framework dimensioned so as to fill the space bounded by 9, 20, and 67 in FIG. 5, if desired. Conveyor 9 must, of course, be sufficiently narrow, in its side to side dimension, to fit between the top ends of springs 21 and 22.

When bypass conveyor 9 is utilized, it is desirable, in order to keep the contents of cartons 15 from being jostled unduly, to reorient conveyor 12 from the dotted-line to the full-line position shown in FIG. 5. Further, when conveyor 9 is utilized, all of the moving parts of inverter 10 are deactivated.

For the sake of convenience and in order to insure that conveyor 9 is always at hand when desired, it may be desired to attach a side rail 140 to upper portions of sidewall 24 and post 78. With appropriate attachment means, for example, cables 141 and 142, shown schematically in phantom lines in FIG. 2, conveyor 9 could then be moved to assume either a standby position wherein it would be located to one side of inverter 10, or to a use position above slide 20 and belt 67 whereby it forms a bridge between section 11 and conveyor 12, as noted above. If desired, brackets, not shown, could be attached to the side of inverter 10 for use in supporting conveyor 9 when it is not in use.

I claim:

1. A mechanism for inverting to an upside down orientation individual rectangular parallelepiped-shaped articles having a substantial height dimension such that the ratios of length to height and width to height do not exceed 4 to 1, said mechanism comprising: and upstream means for conveying said articles seriatim in a substantially horizontal path in the direction of their longitudinal axis, said upstream conveying means having a downstream end; a downwardly inclined slide means having an upper end adjacent to said downstream end of said upstream conveying means for receiving said articles one at a time, the bottom surface of said articles engaging said slide means; elongated stopping means transverse said slide means and above and substantially parallel to the plane thereof; means for engaging said bottom surface of said articles and reorienting said articles such that the plane of said bottom side passes through a vertical position to an unstable overcenter position; a downstream means for receiving said articles and conveying them downstream of said mechanism, said downstream receiving and conveying means having an upstream receiving end spaced a substantial distance from said stopping means.

2. The mechanism of claim 1, said engaging and reorienting means comprising a pusher element having at least portion thereof movable to and fro relative to said slide means.

3. The mechanism of claim 2, said pusher element being supported at the rear of said slide and having a portion movable through an aperture in said slide.

4. The mechanism of claim 1, said stopping means comprising a roller, the axis of rotation of which is substantially parallel to the article-engaging face of said slide means and to a horizontal plane.

5. The mechanism of claim 1 including trigger means adjacent the bottom of said slide means adapted to be engaged by individual articles descending said slide for actuating said engaging and further reorienting means before said articles engage said stopping means.

6. The mechanism of claim 5, said stopping means further comprising a roller, the axis of rotation of which is substantially parallel to the article-engaging face of said slide means and to a horizontal plane; said downstream means for receiving and conveying said articles further comprising an endless belt-type, motor-driven conveyor; said engaging and reorienting means further comprising a motor-driven oscillatable pusher element having a portion movable through an aperture in said slide means when said trigger means is actuated; and spring means near the top of said slide means for insuring that said articles contact said trigger means in descending said slide.

* * * * *